United States Patent [19]

Aritomi et al.

[11] Patent Number: 4,783,522
[45] Date of Patent: Nov. 8, 1988

[54] AROMATIC POLYTHIOETHERIMIDE

[75] Inventors: Mitsutoshi Aritomi; Makoto Terauchi, both of Ibaraki, Japan

[73] Assignee: Mitsubishi Petrochemical Co., Ltd., Tokyo, Japan

[21] Appl. No.: 884,603

[22] Filed: Jul. 11, 1986

[30] Foreign Application Priority Data

Jul. 15, 1985 [JP] Japan .................... 60-155778

[51] Int. Cl.4 ............................ C08G 73/10
[52] U.S. Cl. ......................... 528/352; 528/179; 528/188; 528/222; 528/226; 528/229
[58] Field of Search ............ 528/352, 226, 229, 188, 528/222, 179

[56] References Cited

U.S. PATENT DOCUMENTS 4,197,397  4/1980  D'Alelio ................ 528/352
4,405,770  9/1983  Schoenberg et al. ........ 528/352
4,716,216  12/1987  Takehoshi et al. ......... 528/352

Primary Examiner—Harold D. Anderson
Attorney, Agent, or Firm—Oblon, Fisher, Spivak, McClelland & Maier

[57] ABSTRACT

An aromatic polythioetherimide having a recurring unit of the following general formula (II):

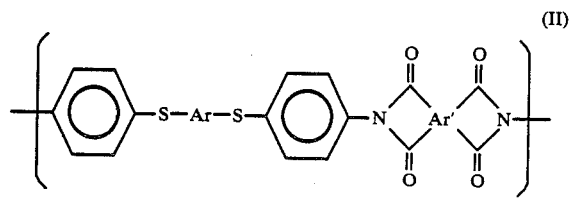

wherein —Ar—, which may be the same or different in the polymer, each represents a divalent aromatic residue and

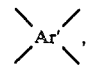

which may be the same or different in the polymer, each represents

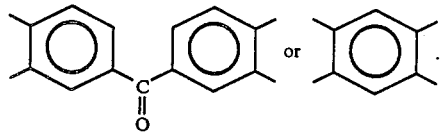

The aromatic polythioetherimides can be melt-molded, are excellent in the balance of mechanical properties and heat resistance, and can be widely used for parts in the electric and electronic fields, housings, automobile parts, aircraft interior parts, sliding parts, gears, cams, insulating materials, heat-resistant films, heat-resistant varnishes, heat-resistant fibers, etc., and preferably can be used as an engineering plastic for gears, cams, etc., and a heat-resistant insulating film material for electronic hardwares.

1 Claim, 2 Drawing Sheets

AROMATIC POLYTHIOETHERIMIDE

FIELD OF THE INVENTION

The present invention relates to aromatic polythioetherimides that can be melt-molded and are excellent in the balance of mechanical properties and heat resistance.

The aromatic polythioetherimides of the present invention are useful as an engineering plastic for gears, cams, etc., and a heat-resistant insulating film material for electronic hardwares.

BACKGROUND OF THE INVENTION

It is known that aromatic polyimides that are quite excellent in heat resistance can be obtained by polycondensation of aromatic tetracarboxylic dianhydrides with aromatic diamines ("Journal of Polymer Science" by C. E. Strong, *Macromolecule Review* (Vol. 11, page 161, (1976)). However, aromatic polyimides that have hitherto been generally proposed are difficult to be melt-molded and their application is limited to extruded insulating films.

To overcome the difficulty, aromatic polyetherimides obtained using aryloxy acid dianhydrides as acid dianhydride have been studied (see Japanese patent publication Nos. 20966/1982 and 20967/1982) and a polyetherimide known under the trademark "ULTEM®" from General Electric Company is commercially available. Though this type of aromatic polyetherimides is excellent in melt extrusion moldability, the heat resistance thereof is lower than that of conventional aromatic polyimides.

On the other hand, other examples such as aromatic polyimides obtained by reacting aromatic diamines having a (thio)ether linkage with pyromellitic dianhydride (see Japanese Laid-Open patent application No. 170122/1984) and polyimidosulfones (see U.S. Pat. No. 4,398,021) that are not so low in heat resistance and can be melt-molded are also reported, but they are practically still unsatisfactory to be used in engineering fields and electronic parts fields where the balance of mechanical properties and heat resistance are required.

SUMMARY OF THE INVENTION

An object of the present invention is to provide aromatic polythioetherimides that can be subjected to melt molding such as extrusion molding, compression molding, and injection molding, and are excellent in heat resistance, electrical insulation property, tensile strength, etc.

The above object can be attained by aromatic polythioetherimides that can be produced by reacting 1 mol of at least one of aromatic diamines having a thioether linkage of the following general formula (I):

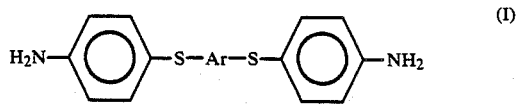

wherein —Ar—, which may be the same or different, each represents a divalent aromatic residue, with 0.99 to 1.01 mol of at least one of 3,3',4,4'-benzophenonetetracarboxylic dianhydride and pyromellitic dianhydride of the following formulae:

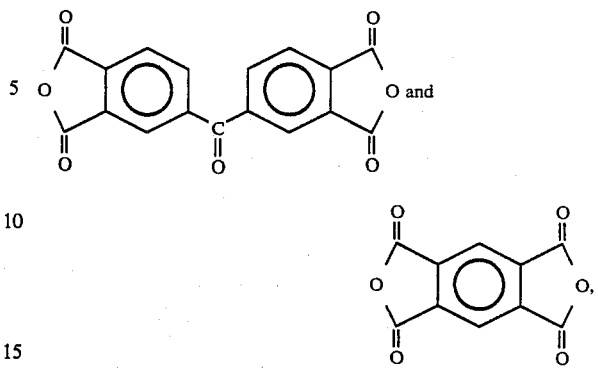

respectively, and have a recurring unit of the following formula (II):

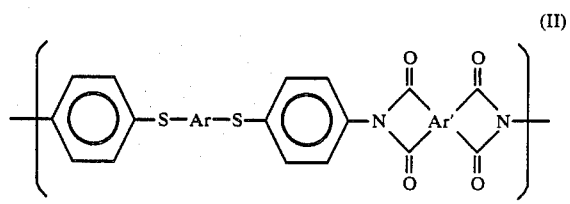

wherein —Ar—, which may be the same or different in the polymer, each represents a divalent aromatic residue, and

which may be the same or different in the polymer, each represents

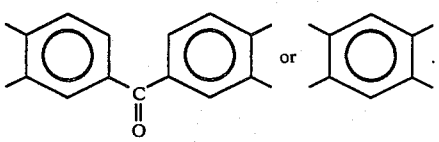

DETAILED DESCRIPTION OF THE INVENTION

Figure 1:
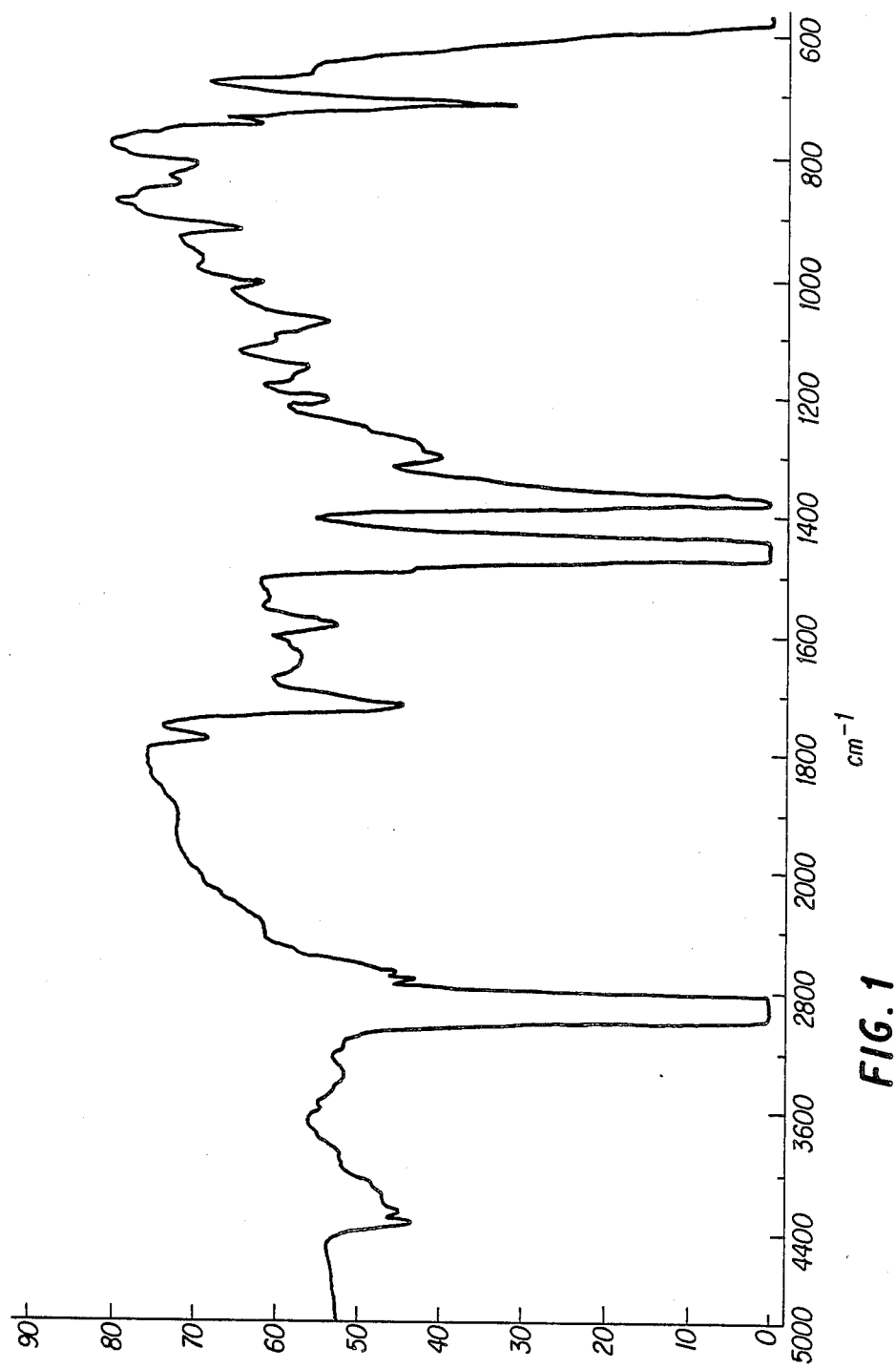
FIG. 1 shows the infrared absorption spectrum chart of the aromatic polythioetherimide obtained in a manner described in Example 3.

The reaction of at least one of aromatic diamines of the general formula (I) with at least one of 3,3',4,4'-benzophenonetetracarboxylic anhydride and pyromellitic anhydride is preferably carried out according to one of the following methods.

(1) One-Stage Method

The aromatic diamine and the carboxylic dianhydride are heated in solution while the resulting water is being removed outside of the system to carry out the polymerization to produce the polyimide.

(2) Two-Stage Method

First Stage:

The aromatic diamine and the carboxylic dianhydride are reacted in solution to obtain the polyamic acid.

Second Stage:

The polyamic acid is subjected to the ring closing reaction by dehydrating it in a solution or solid phase state to produce the polyimide.

These two methods are further described in detail below.

(1) A process of producing aromatic polythioetherimides by the one-stage method:

1.00 mol of at least one of aromatic diamines having a thioether linkage of the following general formula (I):

$$H_2N-\phi-S-Ar-S-\phi-NH_2 \quad (I)$$

wherein —Ar— has the same significance as in the above general formula (I), and 0.99 to 1.01 mol of at least one of polycarboxylic dianhydrides of the following formulae:

[structure: 3,3',4,4'-benzophenone tetracarboxylic dianhydride] O and

[structure: pyromellitic dianhydride]

are dissolved or dispersed in an organic solvent and are heated to 100° to 400° C., preferably to 120° to 250° C. In this case, it is more effective to use additionally an azeotropic solvent such as benzene, toluene, xylene, chlorobenzene, etc., that is useful to remove the water.

Organic solvents used in this process include halogenated aromatic hydrocarbons such as dichlorobenzene, trichlorobenzene, chloronaphthalene, etc.; phenol type compounds such as phenol, cresol, xylenol, chlorophenol, etc.; aliphatic carboxylic acids such as acetic acid, propionic acid, etc., polar aprotic solents such as N,N-dimethylformamide, N,N-dimethylacetamide, N,N-dimethylpropionamide, N,N-dimethylbenzamide, N-methylpyrrolidone, N-methylpiperidone, N-methyl-ε-caprolactam, hexamethylphosphoramide, tetramethylurea, sulfolane, dimethyl sulfoxide, etc.; aliphatic glycol ethers such as ethylene glycol dimethyl ether, diethylene glycol dimethyl ether, etc., and the mixtures thereof. Of these, dichlorobenzene, trichlorobenzene, cresol, chlorophenol, N,N-dimethylformamide, N,N-dimethylacetamide, N-methylpyrrolidone, and diethylene glycol dimethyl ether are particularly preferred.

(2) A process of producing aromatic polythioetherimides by the two-stage method:

First Stage:

1.00 mol of at least one of aromatic diamines having a thioether linkage of the following general formula (I):

$$H_2N-\phi-S-Ar-S-\phi-NH_2 \quad (I)$$

wherein —Ar— has the same significance as in the above general formula (I), and 0.99 to 1.01 mol of at least one of polycarboxylic dianhydrides of the following formulae:

[structure: 3,3',4,4'-benzophenone tetracarboxylic dianhydride] O and

[structure: pyromellitic dianhydride]

are dissolved in an organic solvent and the mixture is stirred at −20° to +80° C., preferably −10° to +60° C., to produce a polyamic acid having a recurring unit of the following general formula:

$$\left\{ \phi-S-Ar-S-\phi-NH\underset{HOOC}{\overset{\overset{O}{\|}}{C}}Ar'\underset{COOH}{\overset{\overset{O}{\|}}{C}}NH \right\}$$

wherein —Ar— and

\Ar'/
/  \ each has the same significance as in the above general formula (II).

Organic solvents used in the first stage include polar aprotic solvents such as N,N-dimethylformamide, N,N-dimethylacetamide, N,N-dimethylpropionamide, N,N-dimethylbenzamide, N-methylpyrrolidone, N-methylpiperidone, N-methyl-ε-caprolactam, hexamethylphosphoramide, tetramethylurea, sulfolane, dimethyl sulfoxide, etc.; aliphatic glycol ethers such as ethylene glycol dimethyl ether, diethylene glycol dimethyl ether, etc., and the mixtures thereof. Particularly, N,N-dimethylformamide, N,N-dimethylacetamide, N-methylpyrrolidone, and diethylene glycol dimethyl ether are preferred.

Second Stage:

The polyamic acid obtained above is subjected to the ring closing reaction by dehydrating it to be converted into the aromatic polythioetherimide of the present invention. This stage can be carried out in the liquid phase or solid phase.

In the case of ring closing reaction in the liquid phase, there are a thermal ring closing method and a chemical ring closing method.

In the thermal ring closing method, the polyamic acid solution is heated to 50° to 400° C., preferably 120° to 250° C., where it is more effective to use an azeotropic solvent such as benzene, toluene, xylene, chlorobenzene, etc., that are useful to remove the water.

In the chemical ring closing method, an aliphatic carboxylic anhydride such as acetic anhydride, propionic anhydride, etc., a halogen compound such as phosphorus oxychloride, thionyl chloride, etc., or a chemical dehydrating agent such as a molecular sieve, silica gel, alumina, phosphorus pentachloride, etc., is added to the polyamic acid solution and the mixture is reacted at 0° to 120° C., preferably at 10° to 60° C.

The ring closure is carried out in the liquid phase, and in many cases the produced aromatic polythioetherimide precipitates, which is filtered to be isolated. However, in some cases, the produced aromatic polythioetherimide remains in the state of a solution. In that case, the solution is diluted with a solvent that does not dissolve the polymer, but is compatible with the solvent used in the reaction so that the polymer is allowed to precipitate and the polymer is filtered to be isolated.

On the other hand, in the ring closing method in the solid phase, first the polyamic acid solution is poured into water or methanol to precipitate the polymer, and the polymer is separated and heat-treated at 150° to 350° C. In this case, if the polymer is treated at or over a high temperature of 250° C. for a longer period, the balance of the mechanical properties and the fluidity when melted would be disadvantageously lowered.

Examples of aromatic diamines having a thioether linkage of the following general formula (I):

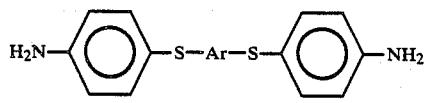

(I)

wherein —Ar— represents a divalent aromatic residue, that will be reacted with a polycarboxylic dianhydride may include 1,4-bis(4-aminophenylthio)benzene, 1,3-bis-(4-aminophenylthio)benzene, 2,4-bis(4-aminophenylthio)nitrobenzene, 2,5-dimethyl-1,4-bis(4-aminophenylthio)benzene, 4,4'-bis(4-aminophenylthio)biphenyl, 4,4'-bis-(4-aminopheylthio)diphenyl ether, 4,4'-bis(4-aminophenylthio)diphenyl sulfide, 1,4-bis[4-(4-aminophenylthio)phenylthio]benzene, α,ω-diaminopoly(1,4-thiophenylene)oligomer, 4,4'-bis(4-aminophenylthio)benzophenone, 4,4'-bis(4-aminophenylthio)diphenyl sulfoxide, 4,4'-bis(4-aminophenylthio)diphenyl sulfone, 3,3'-bis(4-aminophenylthio)diphenyl sulfone, 2,2-bis[4-(4-aminophenylthio)phenyl]propane, 4,4'-bis(4-aminophenylthio)diphenylmethane, etc.

Of these aromatic diamines having a thioether linkage, preference is given to those diamines having as —Ar— a divalent aromatic residue of the following general formula:

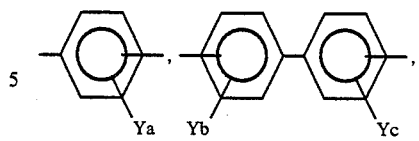

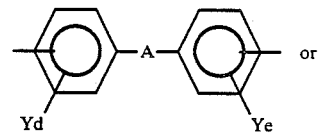

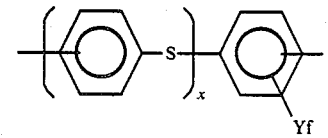

wherein A represents —O—, —CO—, —SO—, —SO$_2$— or —C$_y$H$_{2y}$— in which y is an integer of from 1 to 10, Y represents an alkyl group having 1 to 20 carbon atoms, an aralkyl group having 7 to 20 carbon atoms, a cycloalkyl group having 3 to 20 carbon atoms, an aryl group having 6 to 20 carbon atoms, halogen or a nitro group, a, b, c, d, e and f each is 0 or an integer of from 1 to 4, and x is a number of from 0 to 20.

The thus-obtained aromatic polythioetherimides having a recurring unit of the general formula (II) have a glass transition temperature of 150° to 350° C., the inherent viscosity of the N-methylpyrrolidone solution containing 0.2% by weight of the polymer at 30° C. is at least 0.30 dl/g and the polymers are excellent in heat resistance and moldability.

When the aromatic polythioetherimide of the present invention is molded, various known filler components can be added. Typical examples of filler components may include (a) fibrous fillers such as glass fiber, carbon fiber, boron fiber, aramid fiber, alumina fiber, silicon carbide fiber, etc., and (b) inorganic fillers such as mica, talc, clay, graphite, carbon black, silica, asbestos, molybdenum sulfide, magnesium oxide, calcium oxide, etc.

The polymers of the present invention can be widely used, for example, for parts in the electric and electronic fields, housings, automobile parts, aircraft interior parts, sliding parts, gears, cams, insulating materials, heat-resistant films, heat-resistant varnishes, heat-resistant fibers, etc., and preferably can be used as an engineering plastic for gears, cams, etc., and a heat-resistant insulating film material for electronic hardwares.

The present invention will now be explained with reference to the following Examples. However, this invention should not be construed as in any way limited to the following Examples.

EXAMPLE 1

10.7 g of 4,4'-bis(4-aminophenylthio)benzophenone (0.025 mol), 6.3 g of 3,3',4,4'-benzophenonetetracarboxylic dianhydride (0.025 mol) and 100 ml of N-methylpyrrolidone (NMP) were charged into a 500 ml three-necked flask equipped with a thermometer, a Liebig condenser, and a nitrogen gas inlet, and the reaction mixture was stirred at 50° C. for 3 hours under a flow of nitrogen. After the reaction mixture was cooled to room temperature, the reaction mixture was poured into water to allow the polymer to precipitate, and the polymer was filtered, washed with water, and dried at 70° C. for 8 hours in a vacuum oven. The yield was 15.3 g (90% of theory), and the inherent viscosity was 0.32 dl/g (measured at 30° C. as a 0.2 wt% NMP solution).

Then, the polymer was treated at 150° C. for 24 hours in a vacuum oven to obtain the aimed aromatic polythioetherimide in a yield of 14.3 g (99% of theory), which was substantially insoluble in organic solvents. The physical properties thereof are given below:

Glass transition temperature: 245° C.

Infrared absorption spectrum (according to the Nujol method): 1775 cm$^{-1}$ and 1720 cm$^{-1}$ (imide), 1640 cm$^{-1}$ (ketone), 1080 cm$^{-1}$ (thioether), and 820 cm$^{-1}$ and 720 cm$^{-1}$ (aromatic ring)

This polymer could be compression molded at 360° C.

EXAMPLE 2

10.8 g of 4,4'-bis(4-aminophenylthio)diphenyl sulfide (0.025 mol), 6.3 g of 3,3',4,4'-benzophenonetetracarboxylic dianhydride (0.025 mol), and 100 ml of N,N-dimethylacetamide were charged into a 500 ml three-necked flask equipped with a thermometer, a Liebig condenser, and a nitrogen gas inlet, and the reaction mixture was stirred at 50° C. for 3 hours under a flow of nitrogen. After reaction mixture was cooled to room temperature, the reaction mixture was poured into water to allow the polymer to precipitate, and the polymer was filtered, washed with water, and dried at 70° C. for 8 hours in a vacuum oven. The yield was 15.3 g (89% of theory), and the inherent viscosity was 0.35 dl/g (measured at 30° C. as a 0.2 wt% NMP solution).

Then, 15.3 g of the polymer, 100 ml of N-methylpyrrolidone and 50 ml of toluene were charged into a 500 ml three-necked flask equipped with a thermometer, a water separator having a Liebig condenser, and a nitrogen gas inlet, and the reaction mixture was treated at 180° C. for 2 hours under a flow of nitrogen. The water produced during the treatment was azeotropically removed together with the toluene. Then, after the mixture was cooled to room temperature, the aromatic polythioetherimide was filtered, washed with water and dried at 150° C. for 8 hours in a vacuum oven to obtain the aimed aromatic polythioetherimide in a yield of 14.3 g (99% of theory). The physical properties thereof are given below:

Glass transition temperature: 201° C.

Infrared absorption spectrum (according to the Nujol method): 1775 cm$^{-1}$ and 1720 cm$^{-1}$ (imide), 1660 cm$^{-1}$ (ketone), 1075 cm$^{-1}$ (thioether), and 810 cm$^{-1}$ and 720 cm$^{-1}$ (aromatic ring).

This polymer could be compression molded at 320° C.

EXAMPLE 3

10.7 g of 4,4'-bis(4-aminophenylthio)benzophenone (0.025 mol), 6.3 g of 3,3',4,4'-benzophenonetetracarboxylic dianhydride (0.025 mol), 100 ml of m-dichlorobenzene, 50 ml of 1,2,4-trichlorobenzene and 50 ml of toluene were charged into a 500 ml three-necked flask equipped with a thermometer, a water separator having a Liebig condenser, and a nitrogen gas inlet, and the reaction mixture was stirred at 170° C. for 3 hours under a flow of nitrogen while the produced water was being removed. After the reaction mixture was cooled to room temperature, the polymer was filtered, washed with water, and dried at 150° C. for 8 hours in a vacuum oven. The yield was 15.5 g (96% of theory). The physical properties of the obtained aromatic polythioetherimide are given below:

Glass transition temperature: 262° C.

Thermal decomposition starting temperature: 495° C.

Infrared absorption spectrum (according to the Nujol method; see FIG. 1): 1775 cm$^{-1}$ and 1720 cm$^{-1}$ (imide), 1640 cm$^{-1}$ (ketone), 1080 cm$^{-1}$ (thioether), and 820 cm$^{-1}$ and 720 cm$^{-1}$ (aromatic ring).

This polymer was compression molded at 380° C. and a dark amber-colored tough resin plate having a tensile modulus of 2.5×10$^4$ kg/cm$^2$ was obtained.

This polymer had a recurring unit of the following formula (III):

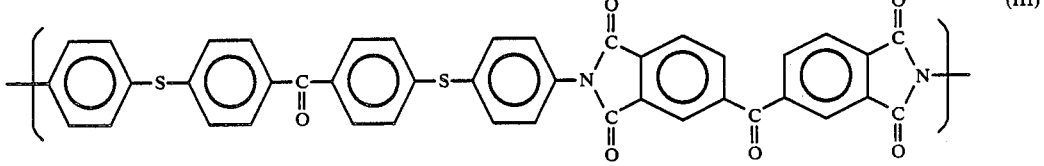

(III)

EXAMPLE 4

Polymerization of a raw material having the composition given below was carried out using the same apparatus as used in Example 3 and an aromatic polythioetherimide having the physical properties given below was obtained in a yield of 15.2 g (94% of theory).

| Composition: | |
|---|---|
| 4,4'-Bis(4-aminophenylthio)diphenyl sulfide | 10.8 g |
| 3,3',4,4'-Benzophenonetetracarboxylic dianhydride | 6.3 g |
| m-Dichlorobenzene | 100 ml |
| 1,2,4-Trichlorobenzene | 50 ml |
| Toluene | 50 ml |

Physical Properties:

Glass transition temperature: 217° C.

Thermal decomposition starting temperature: 486° C.

Infrared absorption spectrum (according to the Nujol method): 1775 cm$^{-1}$ and 1720 cm$^{-1}$ (imide), 1660 cm$^{-1}$ (ketone), 1075 cm$^{-1}$ (thioether), and 810 cm$^{-1}$ and 720 cm$^{-1}$ (aromatic ring)

This polymer was compression molded at 350° C. and a dark amber-colored tough resin plate having a tensile modulus of 2.5×10$^4$ kg/cm$^2$ was obtained.

EXAMPLE 5

Polymerization of a raw material having the composition given below was carried out using the same apparatus as used in Example 3 and an aromatic polythioetherimide having the physical properties given below was obtained in a yield of 46.1 g (95% of theory).

| Composition: | |
|---|---|
| 4,4'-Bis(4-aminophenylthio)benzophenone | 32.1 g |
| 3,3',4,4'-Benzophenonetetracarboxylic dianhydride | 18.9 g |
| o-Dichlorobenzene | 300 ml |
| Xylene | 100 ml |

Physical Properties:
Glass transition temperature: 242° C.
Infrared absorption spectrum (according to the Nujol method): 1775 cm$^{-1}$ and 1720 cm$^{-1}$ (imide), 1640 cm$^{-1}$ (ketone), 1080 cm$^{-1}$ (thioether), and 820 cm$^{-1}$ and 720 cm$^{-1}$ (aromatic ring)

This polymer was compression molded at 380° C. and an amber-colored tough resin plate having a tensile strength of 700 kg/cm$^2$ and a tensile modulus of 2.4×10$^4$ kg/cm$^2$ was obtained.

EXAMPLE 6

Polymerization of a raw material having the composition given below was carried out in the same manner as in Example 3 and an aromatic polythioetherimide having the physical properties given below was obtained in a yield of 16.2 g (95% of theory).

| Composition: | |
|---|---|
| 4,4'-Bis(aminophenylthio)diphenyl sulfone | 11.6 g |
| 3,3',4,4'-Benzophenonetetracarboxylic dianhydride | 6.3 g |
| o-Dichlorobenzene | 100 ml |
| Xylene | 50 ml |

Physical Properties:
Glass transition temperature: 270° C.
Infrared absorption spectrum (according to the Nujol method): 1775 cm$^{-1}$ and 1720 cm$^{-1}$ (imide), 1640 cm$^{-1}$ (ketone), 1150 cm$^{-1}$ (sulfone), 1075 cm$^{-1}$ (thioether), and 810 cm$^{-1}$ and 720 cm$^{-1}$ (aromatic ring).

This polymer could be compression molded at 380° C.

EXAMPLE 7

Polymerization of a raw material having the composition given below was carried out in the same manner as in Example 3 and an aromatic polythioetherimide having the physical properties given below was obtained in a yield of 14.7 g (96% of theory).

| Composition: | |
|---|---|
| 4,4'-Bis(4-aminophenylthio)biphenyl | 10.0 g |
| 3,3',4,4'-Benzophenonetetracarboxylic dianhydride | 6.3 g |
| o-Chlorophenol | 100 ml |
| o-Dichlorobenzene | 100 ml |

Physical Properties:
Glass transition temperature: 260° C.
Infrared absorption spectrum (according to the Nujol method): 1775 cm$^{-1}$ and 1720 cm$^{-1}$ (imide), 1645 cm$^{-1}$ (ketone), 1080 cm$^{-1}$ (thioether), and 805 cm$^{-1}$ and 720 cm$^{-1}$ (aromatic ring).

This polymer could be compression molded at 380° C.

EXAMPLE 8

Polymerization of a raw material having the composition given below was carried out in the same manner as in Example 3 and an aromatic polythioetherimide having a recurring unit of the following formula (IV):

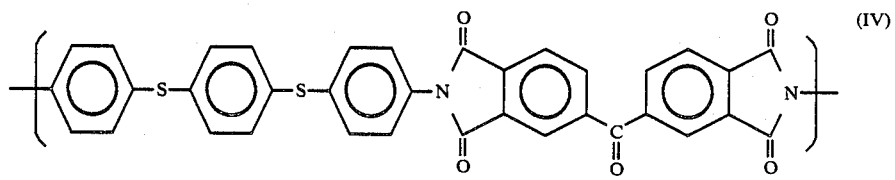

and possessing the physical properties given below was obtained in a yield of 12.6 g (93% of theory).

| Composition: | |
|---|---|
| 1,4-Bis(4-aminophenylthio)benzene | 8.1 g |
| 3,3',4,4'-Benzophenonetetracarboxylic dianhydride | 6.3 g |
| o-Chlorophenol | 100 ml |
| o-Dichlorobenzene | 100 ml |

Figure 2:
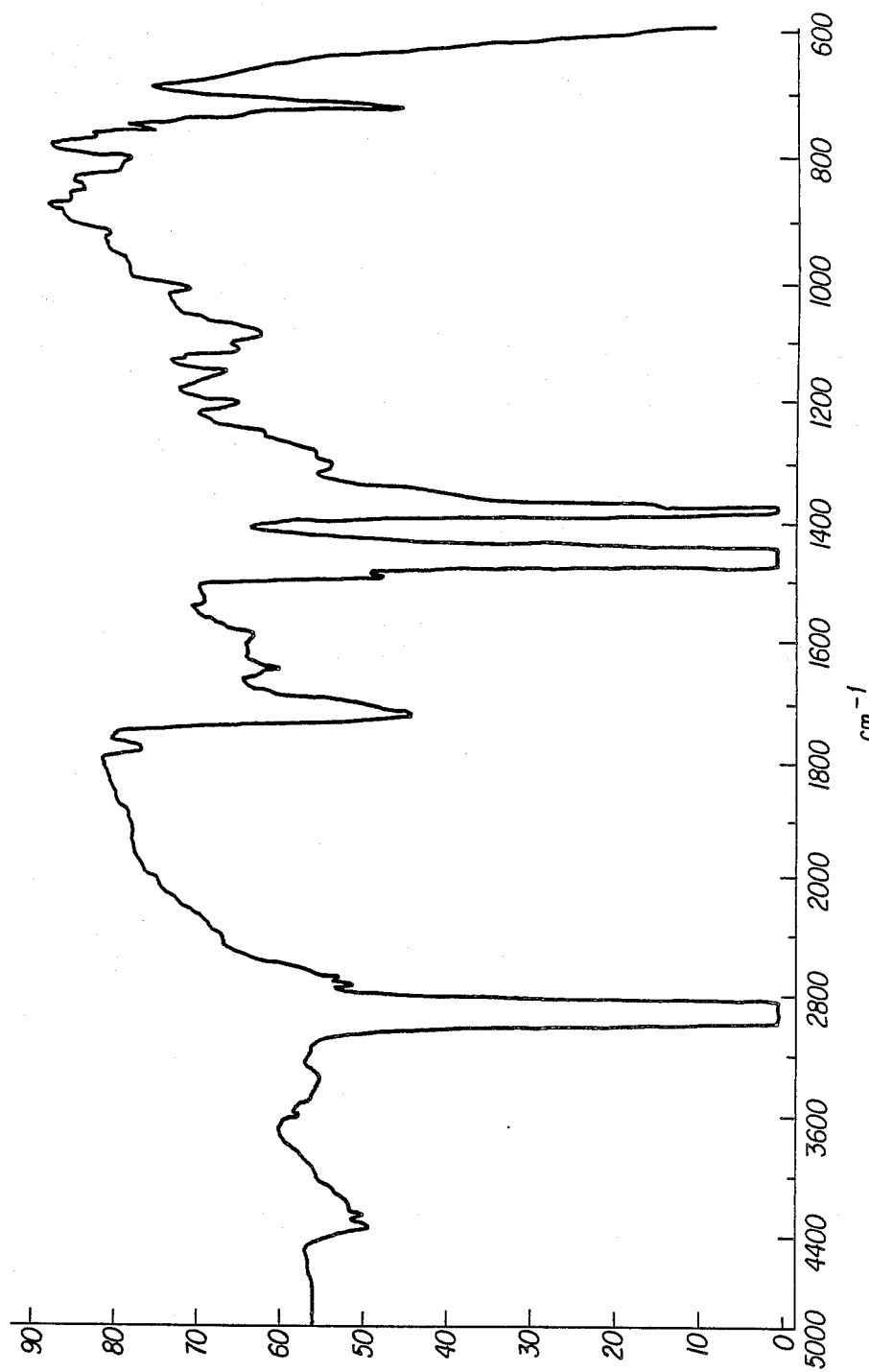
FIG. 2 shows the infrared absorption spectrum chart of the aromatic polythioetherimide obtained in a manner described in Example 8.

Physical Properties:
Glass transition temperature: 258° C.
Softening point: 379° C.
Infrared absorption spectrum (according to the Nujol method; see FIG. 2): 1780 cm$^{-1}$ and 1720 cm$^{-1}$ (imide), 1650 cm$^{-1}$ (ketone), 1085 cm$^{-1}$ (thioether), and 805 cm$^{-1}$ and 720 cm$^{-1}$ (aromatic ring).

This polymer could be compression molded at 400° C.

EXAMPLE 9

Polymerization of a raw material having the composition given below was carried out in the same manner as in Example 3 and an aromatic polythioetherimide having the physical properties given below was obtained in a yield of 17.4 g (92% of theory).

| Composition: | |
|---|---|
| 4,4-Bis[4-(4-aminophenylthio)phenylthio]benzene | 13.5 g |
| 3,3',4,4'-Benzophenonetetracarboxylic dianhydride | 6.3 g |
| o-Chlorophenol | 100 ml |
| o-Dichlorobenzene | 100 ml |

Physical Properties:
Glass transition temperature: 168° C.
Softening point: 288° C.
Infrared absorption spectrum (according to the Nujol method): 1775 cm$^{-1}$ and 1720 cm$^{-1}$ (imide), 1660 cm$^{-1}$ (ketone), 1080 cm$^{-1}$ (thioether) and 810 cm$^{-1}$ and 720 cm$^{-1}$ (aromatic ring).

This polymer could be compression molded at 300° C.

EXAMPLE 10

Polymerization of a raw material having the composition given below was carried out in the same manner as in Example 3 and an aromatic polythioetherimide having the physical properties given below was obtained in a yield of 14.7 g (96% of theory).

| Composition: | |
| --- | --- |
| 4,4-Bis(4-aminophenylthio)diphenyl sulfide | 10.80 g |
| Pyromellitic dianhydride | 5.45 g |
| o-Cresol | 100 ml |
| Xylene | 50 ml |

Phyical Properties:

Glass transition temperature: 237° C.

Softening point: 420° C.

Infrared absorption spectrum (according to the Nujol method): 1780 cm$^{-1}$ and 1720 cm$^{-1}$ (imide), 1080 cm$^{-1}$ (thioether), and 805 cm$^{-1}$ and 720 cm$^{-1}$ (aromatic ring).

This polymer could be compression molded at 430° C.

While the invention has been described in detail and with reference to specific embodiments thereof, it will be apparent to one skilled in the art that various changes and modifications can be made therein without departing from the spirit and scope thereof.

What is claimed is:

1. An aromatic polythioetherimide having a recurring unit of the following general formula (II):

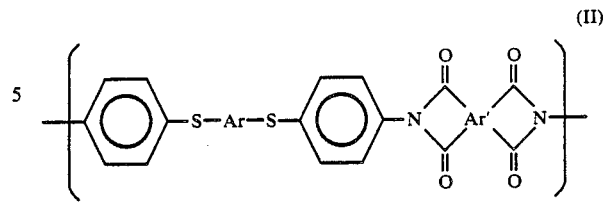

wherein —Ar—, which is the same or different in the polymer, each represents a divalent aromatic residue and

which is the same or different in the polymer, each represents

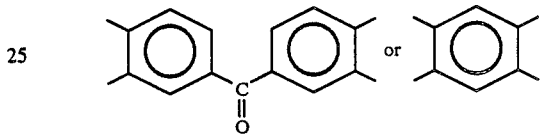

and wherein said divalent aromatic residue has the following general formula:

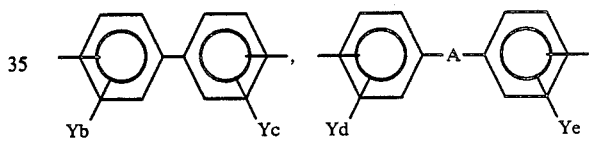

wherein A represents —O—, —CO—, —SO—, —SO$_2$— or —C$_g$H$_{2g}$— in which g is an integer of from 1 to 10, Y represents an alkyl group having 1 to 20 carbon atoms, an aralkyl group having 7 to 20 carbon atoms, a cycloalkyl group having 3 to 20 carbon atoms, an aryl group having 6 to 20 carbon atoms, halogen or a nitro group and, b, c, d and e each is 0 or an integer of from 1 to 4.

* * * * *